(12) United States Patent
Handy

(10) Patent No.: US 10,569,895 B2
(45) Date of Patent: Feb. 25, 2020

(54) SYSTEMS, METHODS, AND DEVICES FOR BIPOLAR HIGH VOLTAGE DIRECT CURRENT GROUND FAULT DETECTION

(71) Applicant: GE Aviation Systems Limited, Cheltenham (GB)

(72) Inventor: Peter James Handy, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 496 days.

(21) Appl. No.: 15/223,006

(22) Filed: Jul. 29, 2016

(65) Prior Publication Data

US 2018/0134408 A1 May 17, 2018

(30) Foreign Application Priority Data

Aug. 7, 2015 (GB) .................................. 1513998.3

(51) Int. Cl.
*B64D 35/04* (2006.01)
*H02H 3/16* (2006.01)
(Continued)

(52) U.S. Cl.
CPC .............. *B64D 35/04* (2013.01); *H02H 3/16* (2013.01); *H02H 3/325* (2013.01); *H02H 7/22* (2013.01)

(58) Field of Classification Search
CPC .......... H02H 3/325; H02H 3/332; H02H 7/22; H02H 7/222; H02H 1/0015; H02H 3/05;
(Continued)

(56) References Cited

U.S. PATENT DOCUMENTS 3,506,906 A * 4/1970 Nestor ..................... H02H 3/17
361/45
4,371,832 A * 2/1983 Wilson ................... H02H 3/332
324/117 R
(Continued)

FOREIGN PATENT DOCUMENTS

CN 1558249 A 12/2004
CN 101413984 A 4/2009
(Continued)

OTHER PUBLICATIONS

Machine translation and Notification of Reasons for Refusal issued in connection with corresponding JP Application No. 2016-150924 dated Aug. 8, 2017.
(Continued)

*Primary Examiner* — Thienvu V Tran
*Assistant Examiner* — Nicolas Bellido
(74) *Attorney, Agent, or Firm* — McGarry Bair PC

(57) ABSTRACT

Systems, methods, and devices for aircraft power distribution include a bipolar high voltage direct current source component; an electrical loading component capable of drawing electrical power from the bipolar high voltage direct current source component; a set of switching components configured to selectively couple power from the bipolar high voltage DC source component to the electrical loading and a ground fault interruption component coupled to the set of switching components. The ground fault interruption component is configured to detect a ground fault based on a sensed difference between a current flowing out of the set of switching components and back from the electrical loading component.

18 Claims, 7 Drawing Sheets

(51) Int. Cl.
 H02H 7/22 (2006.01)
 H02H 3/32 (2006.01)
(58) Field of Classification Search
 CPC .......... H02H 3/087; H02H 3/105; H02H 3/16;
  H02H 1/0007; H02H 7/1222; H02J 1/08;
  H02J 3/36; H03K 17/0822; H03K 17/18;
  H03K 2217/0054; B64D 2221/00; B64D
  35/04; G01R 15/183; G01R 31/025;
  G01R 31/343; G01R 31/42; H02M
  2001/0009; H02M 2001/123; H02M
  5/458
 See application file for complete search history.

(56) References Cited

U.S. PATENT DOCUMENTS

| | | | |
|---|---|---|---|
| 5,361,183 A | | 11/1994 | Wiese |
| 5,539,602 A | * | 7/1996 | Schmitz .................. H02H 3/32 361/42 |
| 8,072,184 B2 | | 12/2011 | Bhade et al. |
| 8,508,896 B2 | * | 8/2013 | Paoletti .................... H02H 3/28 361/42 |
| 8,564,916 B2 | * | 10/2013 | Kazemi .................... H02H 7/20 361/47 |
| 10,027,317 B2 | * | 7/2018 | Handy .................. H02H 3/087 |
| 2001/0029433 A1 | * | 10/2001 | Scott .................... G01R 31/025 702/58 |
| 2010/0110742 A1 | * | 5/2010 | West ....................... H02H 3/16 363/132 |
| 2011/0153234 A1 | * | 6/2011 | Winterhalter .......... H02H 3/332 702/58 |
| 2012/0026631 A1 | * | 2/2012 | Kazemi .................... H02H 3/16 361/42 |
| 2012/0112757 A1 | * | 5/2012 | Vrankovic ........... G01R 31/025 324/509 |
| 2014/0078622 A1 | | 3/2014 | Crane |
| 2014/0132278 A1 | * | 5/2014 | Tang .................... G01R 31/007 324/509 |
| 2017/0054438 A1 | * | 2/2017 | Handy .................. H02H 3/087 |

FOREIGN PATENT DOCUMENTS

| | | |
|---|---|---|
| EP | 2720333 A2 | 4/2014 |
| EP | 2827158 A2 | 1/2015 |
| GB | 2541451 A | 2/2017 |
| JP | H08-512192 A | 12/1996 |
| WO | 2015/038140 A1 | 3/2015 |

OTHER PUBLICATIONS

Office Action issued in connection with corresponding CA Application No. 2938234 dated Mar. 7, 2018.

French Search Report and Written Opinion issued in connection with corresponding FR Application No. 1657556 dated Jun. 8, 2018 (English Translation not available).

Machine translation and First Office Action and Search issued in connection with corresponding CN Application No. 201610885209A dated Jul. 23, 2018.

* cited by examiner

SYSTEMS, METHODS, AND DEVICES FOR BIPOLAR HIGH VOLTAGE DIRECT CURRENT GROUND FAULT DETECTION

BACKGROUND OF THE INVENTION

Electrical power distribution systems manage the allocation of power from energy sources to electrical loads that consume distributed electrical power. In aircraft, gas turbine engines for propulsion of the aircraft typically provide mechanical energy that ultimately powers a number of different accessories such as generators, starter/generators, permanent magnet alternators (PMA), fuel pumps, and hydraulic pumps, e.g., equipment for functions needed on an aircraft other than propulsion. For example, contemporary aircraft need electrical power for electrical loads related to avionics, motors, and other electric equipment.

Over time, aircraft electrical power source voltages have increased. Aircraft with 14- and 28-volt direct current (VDC) electrical power systems have given way to aircraft with electrical power systems operating at 115 volts alternative current (VAC) and 230 VAC. Presently, aircraft can include one or more electrical power sources that operate at voltages including plus/minus 270 VDC. For example, a current wide-body twin-engine commercial jet liner uses an electrical system that is a hybrid voltage system that includes sub-systems operating at voltages of 230 VAC, 115 VAC, 28 VDC along with a bipolar, high voltage, direct current subsystem that includes plus and minus 270 VDC sources.

The voltages in the high-voltage DC electrical systems reach levels comparable to domestic AC systems. In domestic AC systems, a circuit breaker can trip to an off position, typically by way of an electromechanical switch that can actuate in approximately 50 milliseconds (ms), to de-energize the feed line when the ground current exceeds a level of 25 to 30 milliamperes (mA). But, in a high-voltage DC electrical system, similar provisions are complicated because of limited access to the ground return loop required to obtain an accurate enough measurement of current. That is, for unipolar DC voltage electrical systems, discrepancy in output current and return current is difficult to measure because the current return path from the load flows through the aircraft chassis.

BRIEF DESCRIPTION OF THE INVENTION

In one aspect, a system for aircraft power distribution includes a bipolar high voltage direct current (DC) source component with a positive voltage lead and a negative voltage lead; an electrical loading component capable of drawing electrical power from the bipolar high voltage direct current source component; a set of switching components configured to selectively couple power from the bipolar high voltage DC source component to the electrical loading component by switching between an open state that decouples power from the bipolar high voltage direct current source component to the electrical loading component and a closed state that couples power from the bipolar high voltage direct current source component to the electrical loading component wherein a first subset of switching components are coupled to the positive voltage lead of the bipolar high voltage direct current source component and a second subset of switching components are coupled to the negative voltage lead of the bipolar high voltage direct current source component; and a ground fault interruption component coupled between the set of switching components and the electrical loading component, and including a transformer with a high permeability core or an air core and a pair of windings in-phase. Each of the windings corresponds to a respective one of the first and second subset of switching components of the set of switching components, the windings being configured to sense a voltage spike associated with a ground fault.

In another aspect, a method of ground fault mitigation, includes applying power to a bipolar high voltage direct current source component with a positive voltage lead and a negative voltage lead; closing a set of switching components to couple power from the bipolar high voltage direct current source component to an electrical loading component, wherein a first switching component of a set of switching components is coupled to the positive voltage lead and the second switching component of the set of switching components is coupled to the negative voltage lead; detecting a ground fault with a ground fault interruption component based on a sensed difference between a current flowing out of the set of switching components and back from the electrical loading component in a transformer having a high permeability core or an air core and a pair of windings in-phase wherein each of the windings corresponds to a respective one of the first and second switching components of the set of switching components, the windings being configured to sense a voltage spike associated with a ground fault; feeding a signal indicative of the detected ground fault to the set of switching components; and opening the set of switching components to decouple power from the bipolar high voltage direct current source component to an electrical loading component.

In another aspect, a ground fault interruption device includes a bipolar high voltage DC source component. A set of switching components is coupled to the bi-polar high voltage DC source component. A first switching component of the set of switching components is coupled to a positive side of the bipolar high voltage DC source component and a second switching component of the set of switching components is coupled to a negative side of the bipolar high voltage DC source component. A ground fault interruption component is coupled between the set of switching components and the load and includes a transformer with a high permeability core or an air core and a pair of windings in-phase and configured to selectively couple power from the bipolar high voltage DC source component to a load. Each of the windings corresponds to a respective one of the first and second components of the set of switching components, the windings being configured to sense a voltage spike associated with a ground fault.

DESCRIPTION OF EMBODIMENTS OF THE INVENTION

The embodiments of the present invention are described herein in the context of an aircraft, which enables production of electrical power from an energy source such as a turbine engine, jet fuel, hydrogen, etc. However, it will be understood that while one embodiment of the invention is shown in an aircraft environment, the invention is not so limited and has general application to electrical power distribution systems in non-aircraft applications, such as other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

At least some of the embodiments of the invention provide for bipolar high-voltage electrical power distribution systems, methods and apparatuses that include ground fault detection and interruption capabilities. The bipolar high-voltage electrical power distribution system includes a set of switching components such as solid-state power controllers (SSPC). It will be understood that "a set" can include any number of solid-state switches, including a single solid-state switch. Similarly, "a set" as used herein can include any number of elements, including a single element. It will be understood that a bipolar DC power supply or bipolar DC power source as used herein can be defined as a source of direct current electrical power where the output voltage can be set to positive or negative and can source current. It will be understood that high voltage DC as used herein can be defined as electrical energy at voltages high enough to inflict harm on living things. For example, voltages greater than 50 V applied across dry unbroken human skin can cause heart fibrillation if they produce electric currents in body tissues that happen to pass through the chest area. It will be understood that a ground fault as used herein can be defined as an inadvertent contact between an energized conductor of an electrical load or power distribution system and electrical ground such as chassis ground.

Currently, few aircraft include bipolar high-voltage power sources such as plus and minus 270 VDC and none of these aircraft integrate an electrical power distribution system for bipolar high-voltage power. However, with the provision of a high-voltage DC electrical distribution system, bipolar high-voltage DC sources will no longer be confined to a single area of the aircraft. Consequently, bipolar high-voltage DC sources, by way of the electrical distribution system, will need the capability to mitigate ground fault events that can occur anywhere on the aircraft where a load is powered by the bipolar high-voltage DC source.

Figure 1:
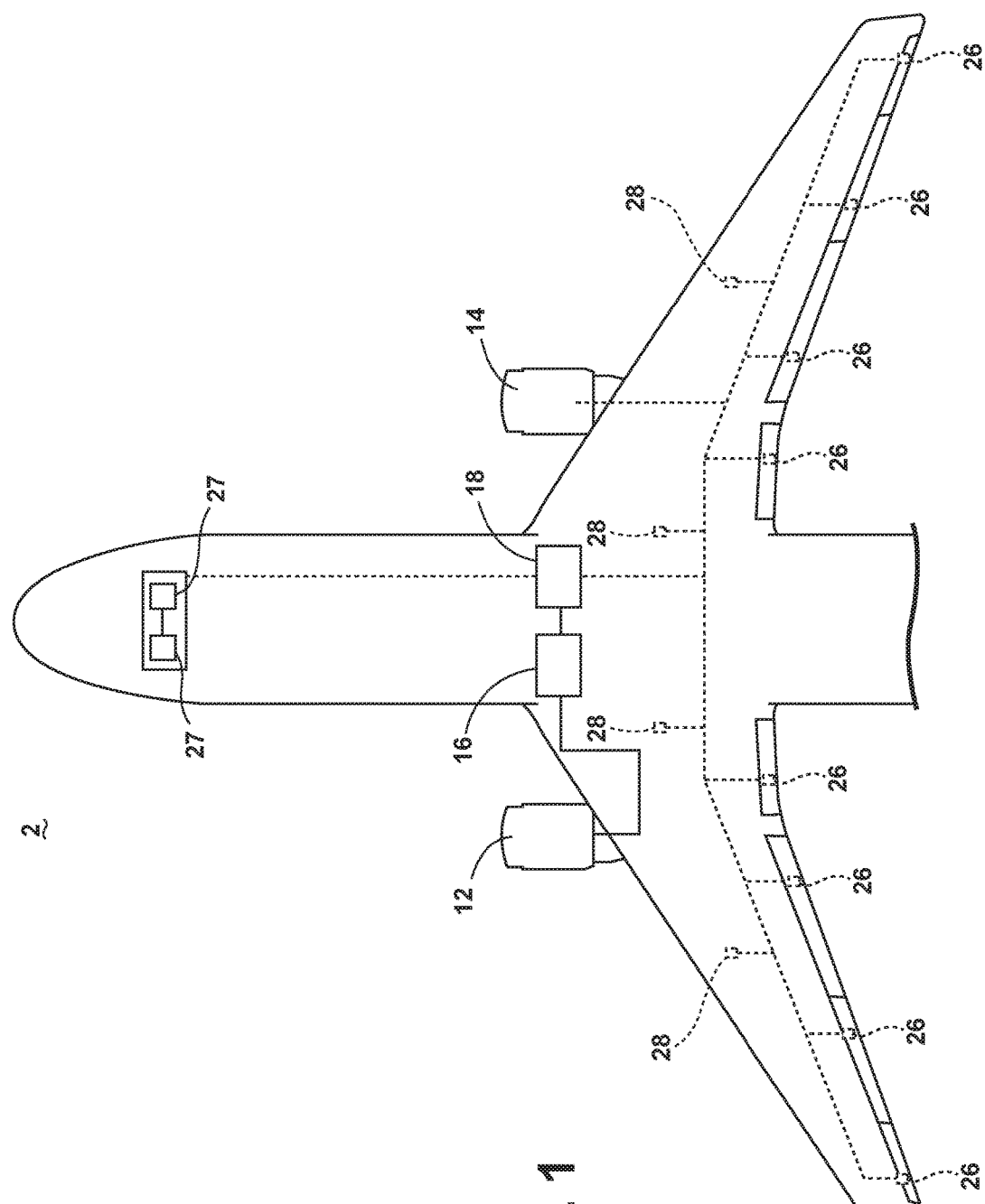
FIG. 1 is an example top down schematic illustration of an aircraft and electrical power distribution system in accordance with various aspects described herein.

Turning now to FIG. 1, an example top down schematic illustration of an aircraft and electrical power distribution system in accordance with various aspects described herein is shown. An aircraft 2 is illustrated as having at least one gas turbine engine, shown here as a left engine system 12 and a right engine system 14 which can be substantially identical to each other. The aircraft 2 can have any number of engine systems. The left engine system 12 can be coupled to one or more electrical power sources 16 that convert mechanical energy into electrical power. It will be understood that any or all of the engines in an aircraft 2, including the left and right engine systems 12, 14 can be so coupled to one or more bipolar high-voltage DC electrical power sources 16. The bipolar high-voltage DC power source 16 can be coupled to an electrical power distribution system 18 that selectively energizes a set of systems and devices on the aircraft 2 that collectively make up the electrical load. Systems and devices powered by the bipolar high-voltage DC power source 16 by way of the electrical power distribution system 18 can be any system or device on an aircraft capable of drawing an electrical load and include, but are not limited to, flight control actuators 26, localized down-convertors 27 for cockpit displays, environmental control systems 28, etc.

In the aircraft 2, the operating left and right engine systems 12, 14 provide mechanical energy that can be extracted via a spool, to provide driving force for the bipolar high-voltage DC power source 16. Other power sources can include but are not limited to generators, batteries, fuel cells, backup power sources such as a ram air turbine (RAT), rectifiers for converting one or more AC source inputs to a bipolar high-voltage DC source etc. The electrical power source 16, in turn, provides the generated power to the electrical loads for the systems and devices 26, 27, 28 for load operations which is distributed by the electrical power distribution system 18.

Figure 2:
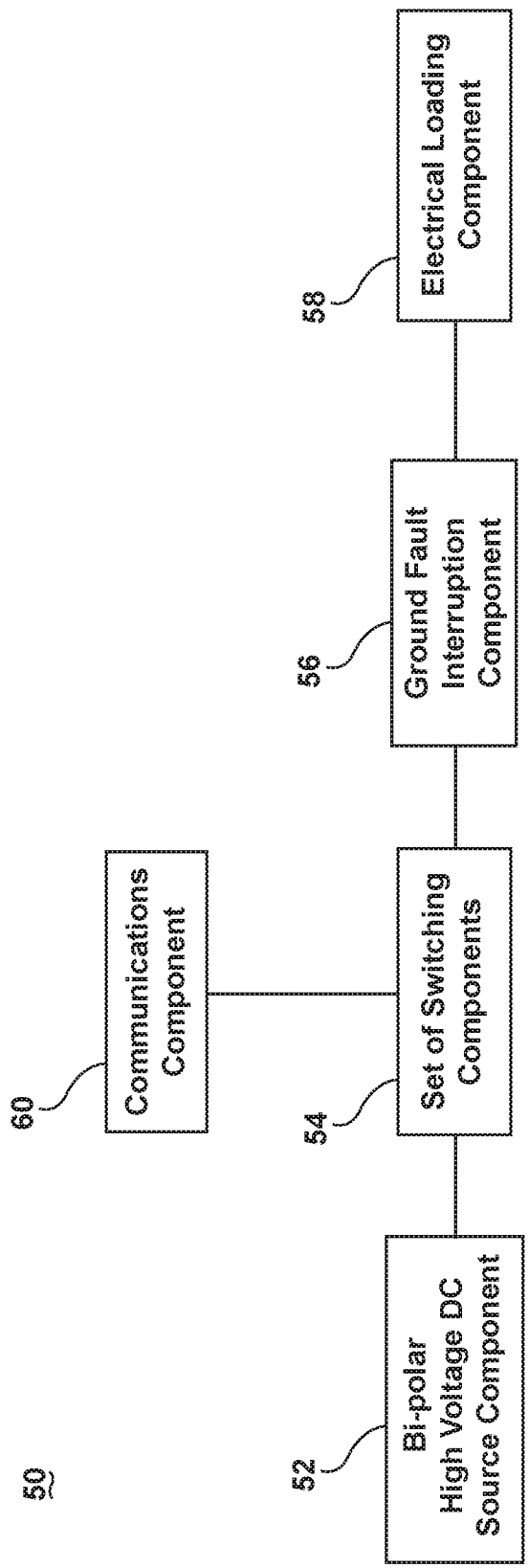
FIG. 2 is an example diagram of a high voltage DC electrical power distribution system in accordance with various aspects described herein.

Turning now to FIG. 2, an example diagram of a bipolar high-voltage DC electrical power distribution system 50 in accordance with various aspects described herein is shown. The bipolar high-voltage DC electrical power distribution system includes a bipolar high voltage DC source component 52 coupled to a set of switching components 54. The set of switching components 54 selectively couples power from the bipolar high voltage DC source component to an electrical loading component 58. Coupled to both the set of switching components 54 and the electrical loading component 58, a ground fault interruption component 56 provides for measurement of current flow out of the set of switching components 54 and back from the electrical loading component 58. A communications component 60 is coupled to the set of switching components 54 to control and monitor the state of the set of switching components 54.

The bipolar high voltage DC source component 52 is a bipolar high-voltage DC power source or supply. The bipolar high voltage DC source component 52 can output any positive and negative voltage level for use in distributing electrical power to an electrical loading component 58 including but not limited to positive and negative 270 V.

The set of switching components 54 includes a set of solid-state switches. The set of solid-state switches can include any type of solid-state switch capable of switching on or off (i.e. closed or open) when an external voltage is applied across a set of control terminals of the switch. Each of the solid-state switches in the set of switching components 54 can include a solid-state electronic switching device which switches power to the load circuitry of the electrical loading component 58, and a coupling mechanism to enable the control signal to activate the switch without electromechanical components. The set of switching components 54 can be any type of solid-state electronic switches including but not limited to a solid-state power controller (SSPC), a solid-state relay including a single metal-oxide-semiconductor field-effect transistor (MOSFET) a solid-state relay including multiple MOSFETs arranged in a parallel configuration, etc.

One configuration of the set of switching components 54 includes the provision of SSPCs which are semiconductor devices that control electrical power supplied to a load. Additionally, SSPCs perform supervisory and diagnostic functions in order to identify overload conditions and prevent short circuits. Functionally, SSPCs are similar to circuit breakers with electromechanical switching elements that will protect wiring and loads from faults, but because SSPCs are more reliable and faster at switching the power off than electromechanical circuit breaking elements, SSPCs are typically used in safety-critical power systems such as those found in aircraft. SSPCs can switch states within the order of microseconds in comparison to electromechanical switches that require approximately 30 ms to complete a transition from one state to another. Implemented with SSPCs, the set of switching components 54 can include built-in monitoring and protection features including but not limited to voltage monitoring, current monitoring, temperature monitoring, current limiting, $I^2t$ monitoring, arc fault protection, and low-fidelity ground fault protection, etc. The built-in monitoring and protection features of SSPCs enable the set of switching components 54 to function as a controller that can control outputs to loads to ensure proper operations. SSPCs can include configurable microprocessors that can be programmed to increase controlling characteristics. The current monitoring on an SSPC is typically not of sufficient resolution for ground fault detection. That is, current monitoring functions of SSPCs are capable of a range of 3 to 5% resolution. Consequently, a switch passing approximately 10 amperes (A) will not detect a ground fault less than 300 mA with the built-in ground fault protection of an SSPC.

The set of switching components 54 can include any number of switches including but not limited to one switch coupled to a positive lead from the bipolar high voltage DC source component 52 and a second switch coupled to a negative lead from the bipolar high voltage DC source component 52. Therefore, in one configuration, the set of switching components 54 includes a first SSPC coupled to a positive lead from the bipolar high voltage DC source component 52 and a second SSPC coupled to a negative lead from the bipolar high voltage DC source component 52.

The communications component 60 to control and monitor the state of the set of switching components 54 communicates with other control elements of the aircraft. The communications component 60 reports the status of the SSPCs back to other vehicle management control systems. The communications component 60 can transmit data to the switch; the data indicative of commands to the switch, reading the status of the switch that includes whether the switch is open or closed and monitoring the health of the switch that includes the temperature of the switch. The communications component 60 can be based on any data communications hardware and protocol capable of transmitting data related to the control and the state of the set of switching components 54 including but not limited to a balanced interconnecting cable configured to implement Recognized Standard 485 (RS-485), a two wire serial cable configured to implement controller area network (CAN bus) protocol, a three or five wire serial cable configured to implement Recognized Standard 232 (RS-232), etc.

The ground fault interruption component 56 monitors the output of both a positive and negative SSPC current in the bipolar high voltage DC distribution system 50. With a bipolar high voltage electrical distribution system 50, current travels from the bipolar high voltage DC source component 52, out to the set of switching components 54, out to the electrical loading component 58 and then back again. Therefore, the ground fault interruption component 56 is configured to determine the difference between the current flowing from the set of switching components 54 to the electrical loading component 58 and the current flowing back from the electrical loading component 58 to the set of switching components 54. The ground fault interruption component 56 can be formed from any device capable of determining a differential current indicative of a ground fault in the bipolar high voltage electrical distribution system 50 including but not limited to a conventional physical transformer, a toroidal current transformer, a DC Hall effect sensor, and a fluxgate current transducer.

Figure 3:
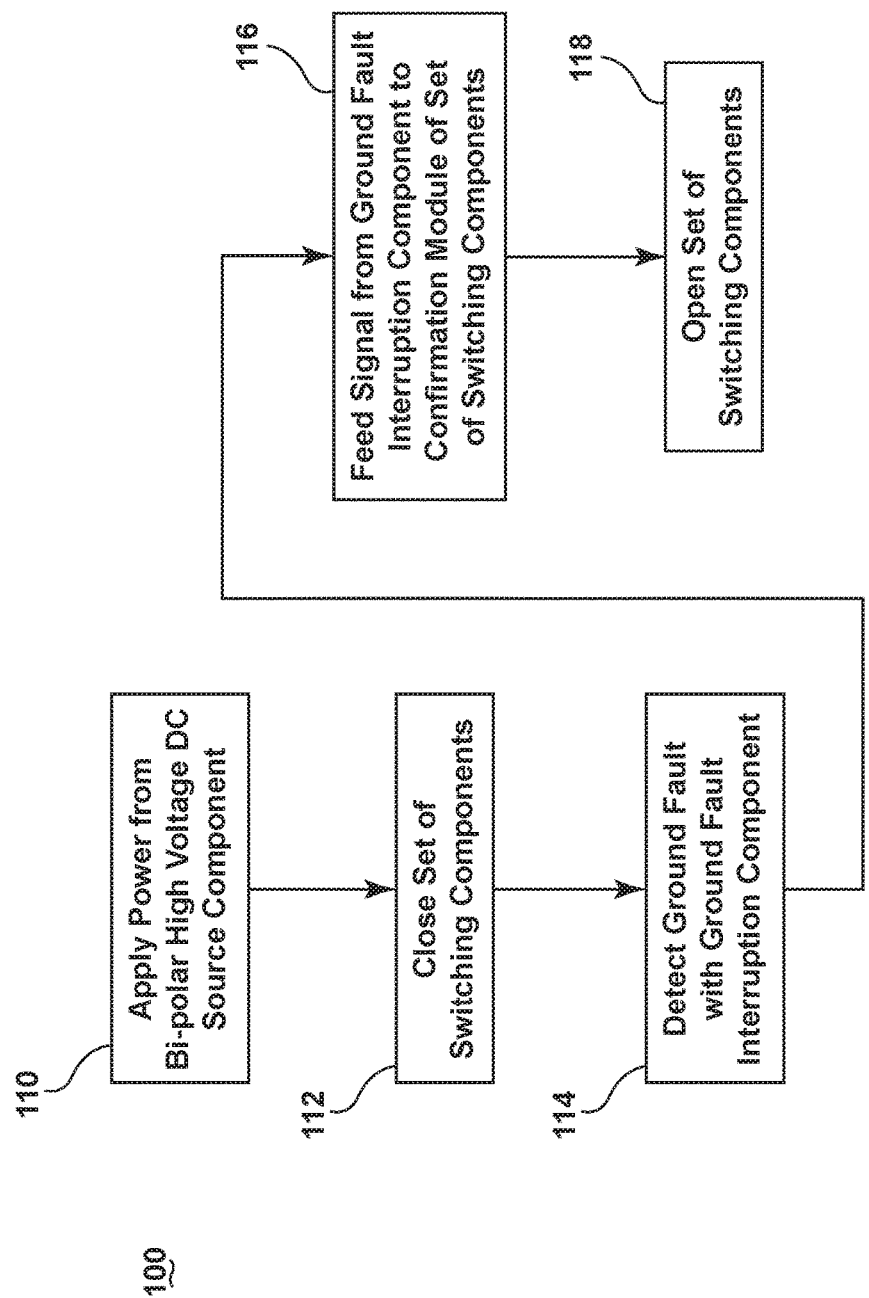
FIG. 3 is a flowchart illustrating a method of interrupting a ground fault on a bipolar high voltage DC electrical power system in accordance with various aspects described herein.

Referring now to FIG. 3, a flowchart illustrating a method 100 of interrupting a ground fault on a bipolar high voltage DC electrical power system in accordance with various aspects described herein is shown. At 110, the bipolar high voltage DC source component 52 applies power to the bipolar high voltage DC distribution system 50. Depending on the type or configuration of the bipolar high voltage DC source component 52, the application of power can include activating a generator, starting an engine, issuing a control command to energize the source, closing one or more circuits etc. At 112, the set of switching components 54 close. The electrical loading components 58 are energized and, during normal operation, correctly sink power as per the operational requirements of said electrical loading components 58. If a ground fault occurs, at 114, the ground fault interruption component 56 detects the ground fault. To detect a ground fault, the ground fault interruption component 56 can sense or detect any electrical characteristic indicative of a ground fault including but not limited to a voltage, a current, a resistance, a change in voltage, a change in current a change in resistance in any electrical component internal or external to the electrical power distribution system 50. The ground fault interruption component 56 can sense or detect the signal with any modality used for signal detection and processing including but not limited to digital, analog, discrete, continuous or combinations thereof. The ground fault interruption component 56 feeds a signal, at 116, to a monitoring module, as in component 218 below in FIGS. 4 and 5, of the set of switching components 54. At 118, the set of switching components 56 opens the switches and de-energizes the electrical loading component 58.

Figure 4:
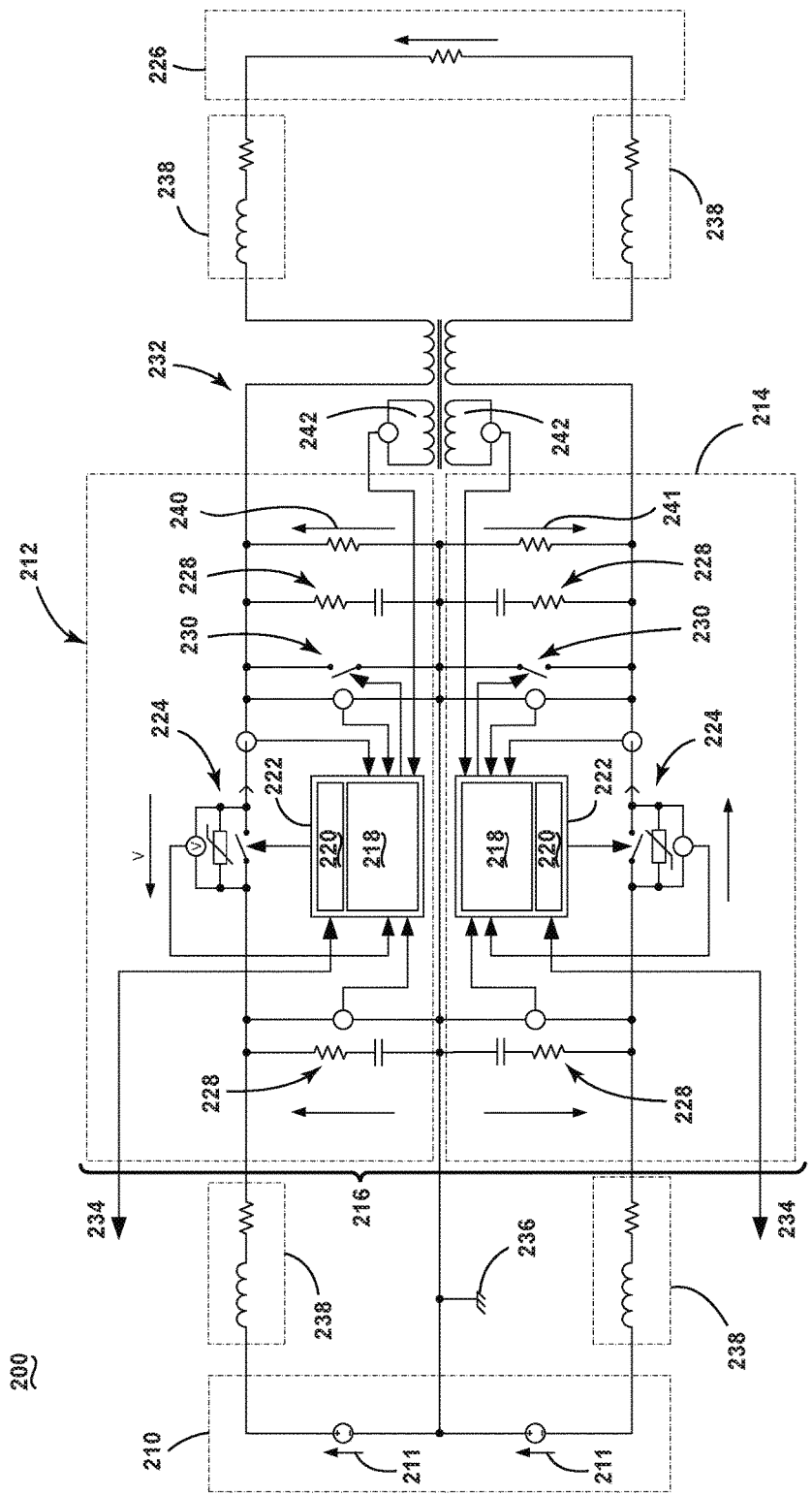
FIG. 4 is an example schematic illustration of a bipolar high voltage electrical power distribution system with a ground fault interruption component in accordance with various aspects described herein.

Referring now to FIG. 4, an example schematic illustration of a bipolar high voltage electrical power distribution system 200 with a ground fault interruption component 232 in accordance with various aspects described herein is shown. The bipolar high voltage DC source component 210 includes two high voltage DC sources 211 each coupled to chassis ground 236, one by the negative lead and the other by the positive lead. The bipolar high voltage DC source component 210 is coupled to the set of switching components 216 which includes two SSPCs 212 and 214; a first SSPC 212 coupled to the positive side of the bipolar high voltage DC source component 210 and a second SSPC 214 coupled to the negative side of the bipolar high voltage DC source component 210. The coupling between the bipolar high voltage DC source component 210 and the set of switching components 216 can include current limiting wire 238. The set of switching components 216 are coupled to the ground fault interruption component 232. The ground fault interruption component 232 is coupled to the electrical loading component 226. The coupling between the ground fault interruption component 232 and the electrical loading component 226 can include current limiting wire 238.

The first and second SSPC 212, 214 can include a number of subcomponents and modules for controlling and protecting the set of switching components 216. An SSPC 212, 214 can include a main solid state switch 224 that opens or closes to couple or decouple the electrical loading component 226 to the bipolar high voltage DC source component 210. The main solid state switch 224 can include one or more protective elements including but not limited to a metal-oxide varistor (MOV), a transient voltage suppressor (TVS), etc. An SSPC 212, 214 can include one or more snubber circuits 228 across the input of the switch, the output of the switch or both, to suppress voltage spikes and dampen ringing caused by circuit inductance when a switch opens. An SSPC 212, 214 can include one or more built-in test circuits 230 to provide Built-In Testing (BIT) features. The built-in test circuit 230 allows for operation of an Initiated Built-In Test (IBIT) scheme that enables self-testing of the SSPC 212, 214 to verify proper functioning of the SSPC 212, 214. The built-in test circuit 230 can test any feature of the SSPC and includes but is not limited to an arc fault detection circuit for the detection of an arc fault. When both SSPCs are open the voltage developed at the output of each SSPC due to semiconductor leakage is managed by resistive element 240, 241 coupled to the output of the SSPC 212, 214 and chassis ground 236. The SSPC 212, 214 can include a switch control subcomponent 222 that can coordinate communications with external communication components 234, enable protective functions via a monitoring module 218 and control the state of the main switch 224 of the SSPC 212, 214. The monitoring module 218 can include any monitoring features for determining potential events that can damage the switch including but not limited to voltage monitoring, current monitoring, temperature monitoring, current limiting, I²t monitoring, arc fault protection, and low fidelity ground fault protection, etc. The control module 220 can control the state of the main switch 224 based on inputs from either external communications components 234 or the monitoring module 218 or combinations thereof.

As shown in FIG. 4, the ground fault interruption component 232 includes a conventional physical transformer with a magnetic core. Positive and negative feeder cables from the output of the positive and negative SSPCs 212, 214 are fed through the transformer with windings in phase. The sense windings 242 at the transformer provide an indication of imbalance indicative of a ground fault. During normal operation where the current flow from the positive side of the load of the electrical loading component 226 and the current from the negative side of the load of the electrical loading component 226 are of equal magnitude the resultant sense voltage is zero. Because, the load of the electrical loading component 226 is not asymmetrically chassis referenced, as would be the case for a system with a unipolar DC voltage source, at the point that a ground fault occurs on either the positive or negative output of the set of switching components 216, a positive or negative voltage spike is sensed on the sense windings 242 of the transformer of the ground fault interruption component 232, thus determining the existence and location of the fault. Two windings are provisioned on the transformer of the ground fault interruption component 232 to account for the two separate SSPCs 212, 214 monitoring for ground faults. Because there is no DC magnetic field in the core of the transformer during normal operation, the transformer can include either an air core or high permeability core. The number of turns on each sense winding 242 can be increased to provide additional sensitivity to ground faults, as can the permeability of the core material selected. The output voltage from each sense coil can be filtered in order to eliminate nuisance trips created by the operation of switching between multiple loads with various electrical characteristics.

Figure 5:
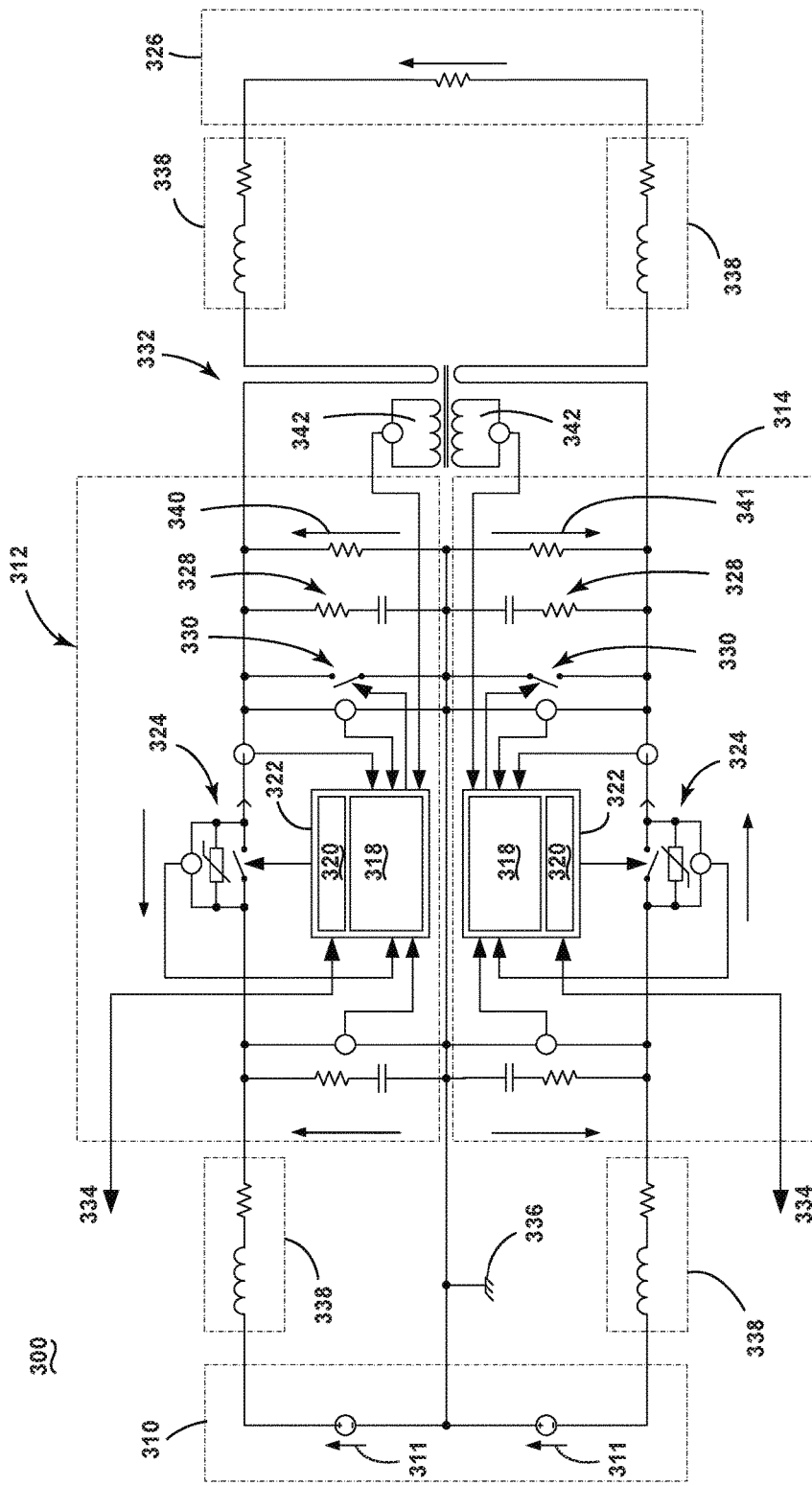
FIG. 5 is an example schematic illustration of a bipolar high voltage electrical power distribution system with a ground fault interruption component in accordance with various aspects described herein.

FIG. 5 is an example schematic illustration of a bipolar high voltage electrical power distribution system with a ground fault interruption component in accordance with various aspects described herein. The bipolar high voltage electrical power distribution system with a ground fault interruption component is similar to that illustrated in FIG. 4; therefore, like parts will be identified with like numerals increased by 100, with it being understood that the description of the like parts of the first bipolar high voltage electrical power distribution system with a ground fault interruption component applies to the second bipolar high voltage electrical power distribution system with a ground fault interruption component, unless otherwise noted. The ground fault interruption component 332 includes a toroidal current transformer.

Figure 6:
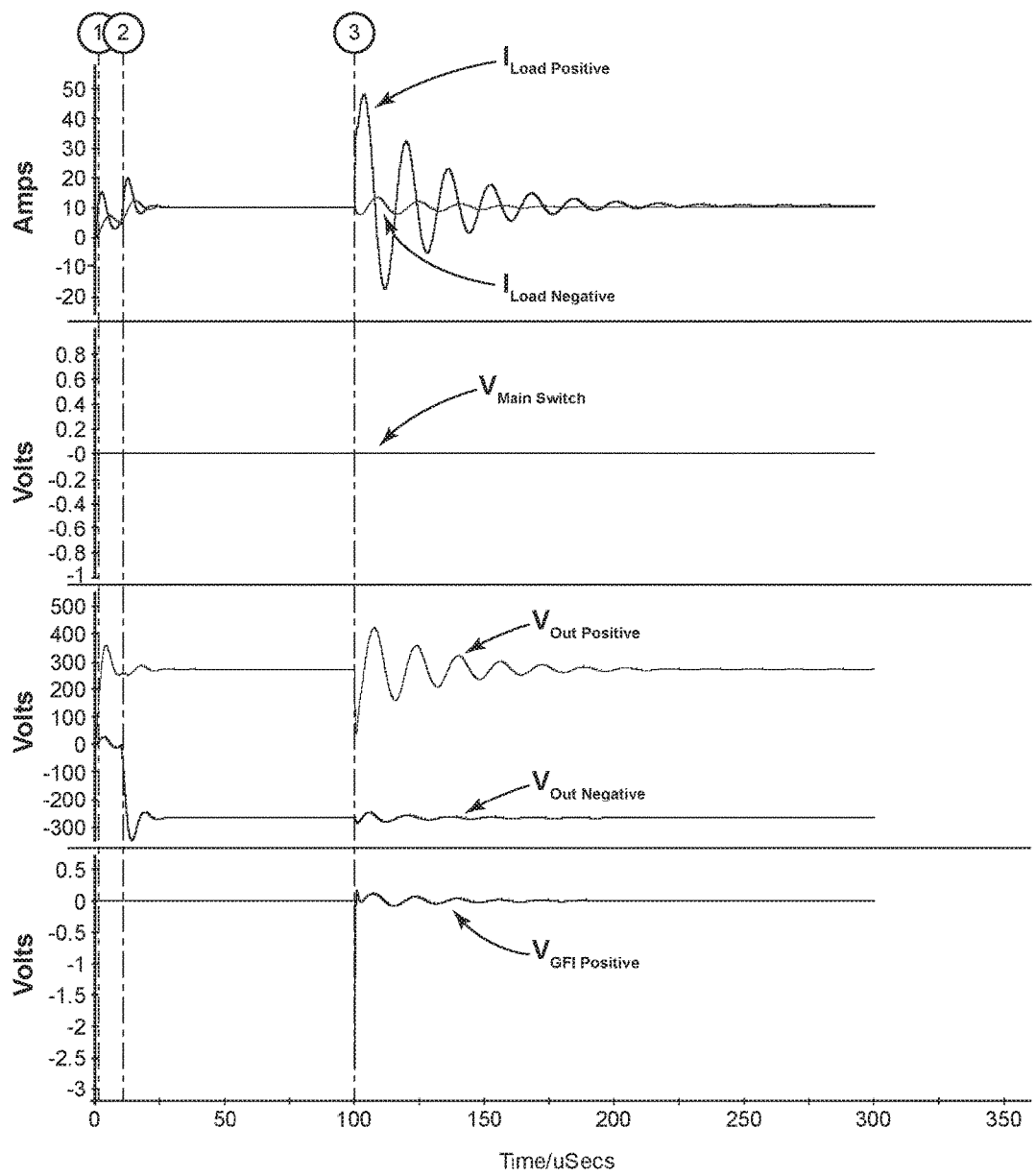
FIG. 6 is an example plot of voltage and current waveforms that demonstrates the operation of the bipolar high voltage electrical power distribution system with a ground fault interruption component in accordance with various aspects described herein.

FIG. 6 shows the result of a simulation of the ground fault detection system with a human body model connected directly to the output of the positive SSPC 212. The set of example graphs provided are intended to illustrated one non-limiting example of the method, as described, and do not specifically represent any necessary signals, sensors, values, or operations of the method. At time (1), power is applied to the bipolar high voltage DC source component 52 which is a positive and negative 270 VDC supply such as shown in FIG. 4 and FIG. 5 as 210, 310. At time (2), the set of switching components 54 which is two SSPCs 212, 214 are closed to energize electrical loading component 58. At time (3), a ground fault that is modelled by a 450 nanofarad (nF) capacitor in parallel with a 500 ohm (Ω) resistor is applied to the output of the positive SSPC 212, 312, thus triggering a voltage spike on the sense winding 242, 342 of the ground fault interruption component 56, 232, 332. The signal can be fed to the monitoring module 218, 318 of the switch control sub-component 222, 322 of the SSPC 212, 214, 312, 314. In the event of a confirmed fault, the control module 220, 320 can open the SSPC 212, 214, 312, 314.

Figure 7:
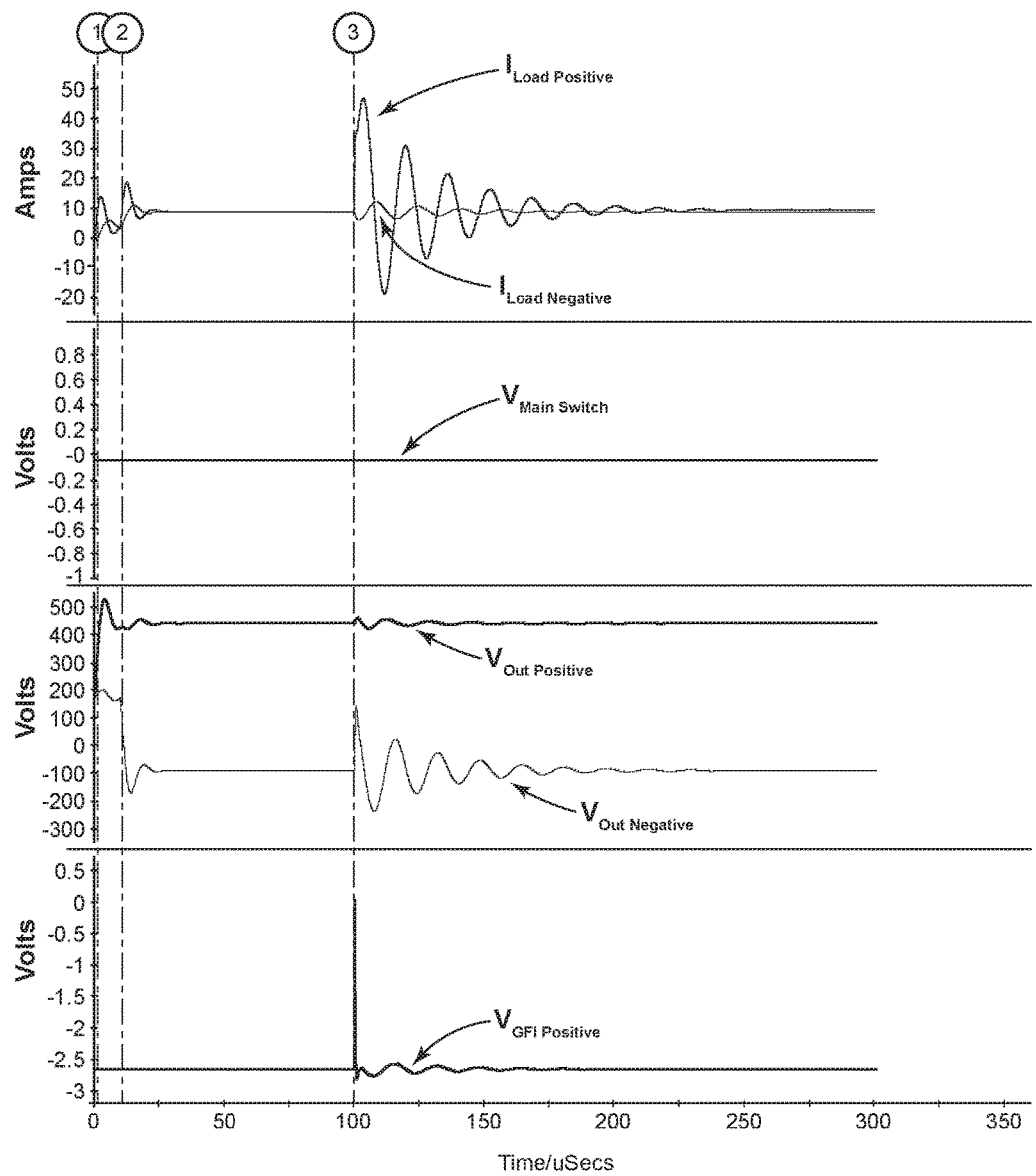
FIG. 7 is an example plot of voltage and current waveforms that demonstrates the operation of the bipolar high voltage electrical power distribution system with a ground fault interruption component in accordance with various aspects described herein.

FIG. 7 shows the result of a simulation of the ground fault detection system with a human body model connected directly to the output of the negative SSPC 214, 314. Again, the set of example graphs provided are intended to illustrated one non-limiting example of the method, as described, and do not specifically represent any necessary signals, sensors, values, or operations of the method. At time (1), power is applied to the bipolar high voltage DC source component 52 which is a positive and negative 270 VDC supply such as shown in FIG. 4 and FIG. 5 as 210, 310. At time (2), the set of switching components 54 which is two SSPCs 212, 214, 312, 314 are closed to energize electrical loading component 58. At time (3), a ground fault that is modelled by a 450 nanofarad (nF) capacitor in parallel with a 500 ohm (Ω) resistor is applied to the output of the positive SSPC 212, 312, thus triggering a voltage spike on the sense winding 242, 342 of the ground fault interruption component 56, 232, 332. Again, the signal can be fed to the monitoring module 218, 318 of the switch control subcomponent 222, 322 of the SSPC 212, 214, 312, 314. In the event of a confirmed fault, the control module 220 can open the SSPC 212, 214.

While an electrical power distribution system with a unipolar DC source returns current through the aircraft chassis, an electrical power distribution system with a bipolar DC source transmits current down one wire and returns through another, enabling access to both the feed and return from each supply. In this way, the ground fault interruption component takes advantage of positive and negative wires on the load. Therefore, the bipolar DC electrical power distribution system can include the measurement of a differential current between send and return feeds. The differential current measurement enables the bipolar DC electrical power distribution system to determine if power is being transmitted from one side of the load to the chassis ground indicative of a ground fault.

Technical effects of the above-described embodiments include detection and mitigation of ground fault events a high voltage DC power distribution system based on the provision of a simple and cost effective ground fault detection and interruption scheme. Also, the above-described embodiments bypass the issue of steady-state DC bias in a transformer-based ground fault interrupt system by using a single magnetic core for the feed and return currents which results in no steady state magnetic field in the core of the transformer. The above-described electrical power distribution system monitors the output of both a positive and negative SSPC current in a bipolar high voltage DC network and can determine a ground leakage current on the order of 5 mA in order to provide a more sensitive ground fault detection system.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for aircraft power distribution, comprising:
    a bipolar high voltage direct current (DC) source component with a positive voltage lead and a negative voltage lead;
    an electrical loading component capable of drawing electrical power from the bipolar high voltage direct current source component;
    a set of switching components configured to selectively couple power from the bipolar high voltage DC direct current source component to the electrical loading component by switching between an open state that decouples power from the bipolar high voltage direct current source component to the electrical loading component and a closed state that couples power from the bipolar high voltage direct current source component to the electrical loading component wherein a first subset of switching components are coupled to the positive voltage lead of the bipolar high voltage direct current source component and a second subset of switching components are coupled to the negative voltage lead of the bipolar high voltage direct current source component; and
    a ground fault interruption component coupled between the set of switching components and the electrical loading component, and including a transformer with a high permeability core or an air core and a pair of windings in-phase;
    wherein each of the windings corresponds to a respective one of the first and second subset of switching components of the set of switching components the windings being configured to sense a voltage spike associated with a ground fault.

2. The system of claim 1 wherein at least a subset of the set of switching components opens in response to a sensed signal from the ground fault interruption component.

3. The system of claim 1 wherein the bipolar high voltage direct current source component includes two 270 volt direct current power supplies.

4. The system of claim 3 wherein a negative lead of one of the two 270 volt direct current power supplies is coupled to a chassis ground and a positive lead of the other of the two 270 volt direct current power supplies is coupled to the chassis ground.

5. The system of claim 1 wherein the set of switching components includes two solid-state power controllers (SSPCs).

6. The system of claim 1 further comprising a communications component configured to apply an external voltage across a set of control terminals of the set of switching components to set the state of the set of the switching components.

7. The system of claim 1 wherein the transformer includes a toroidal current transformer.

8. The system of claim 1 wherein the ground fault interruption component includes a DC Hall effect sensor.

9. The system of claim 1 wherein the transformer includes a pair of sense windings that sense a positive or negative voltage spike indicative of a ground fault based on the difference between the current flow from the positive side of the load of the electrical loading component and the current from the negative side of the load of the electrical loading component.

10. The system of claim 1 wherein the sensed difference between the current flowing out of the set of switching components and back from the electrical loading component is less than or equal to 30 milliamps.

11. A method of ground fault mitigation, the method comprising:
    applying power a bipolar high voltage direct current source component with a positive voltage lead and a negative voltage lead;
    closing a set of switching components to couple power from the bipolar high voltage direct current source component to an electrical loading component, wherein a first switching component of the set of switching components is coupled to the positive voltage lead and a second switching component of the set of switching components is coupled to the negative voltage lead;

detecting a ground fault with a ground fault interruption component based on a sensed difference between a current flowing out of the set of switching components and back from the electrical loading component in a transformer having a high permeability core or an air core and a pair of windings in-phase wherein each of the windings corresponds to a respective one of the first and second switching components of the set of switching components the windings being configured to sense a voltage spike associated with a ground fault;

feeding a signal indicative of the detected ground fault to the set of switching components; and opening the set of switching components to decouple power from the bipolar high voltage direct current source component to an electrical loading component.

12. The method of claim 11 wherein the step of feeding a signal indicative of the detected ground fault includes a step of filtering the signal to remove nuisance trips.

13. The method of claim 11 wherein the step of feeding a signal indicative of the detected ground fault includes transmitting the signal from the ground fault interruption component to a monitoring module of the set of switching components and further includes a step of confirming the fault event by the monitoring module.

14. The method of claim 13 further including a step of transmitting via a communications component a state of the set of switching components back to a vehicle management control system.

15. A ground fault interruption device, comprising:
a bipolar high voltage DC source component;
a set of switching components coupled to the bi-polar high voltage DC source component and configured to selectively couple power from the bipolar high voltage DC source component to a load;
wherein a first switching component of the set of switching components is coupled to a positive side of the bipolar high voltage DC source component and a second switching component of the set of switching components is coupled to a negative side of the bipolar high voltage DC source component;
a ground fault interruption component (i) coupled between the set of switching components and the load and (ii) including a transformer with a high permeability core or an air core and a pair of windings in-phase;
wherein each of the windings corresponds to a respective one of the first and second switching components of the set of switching components, the windings being configured to sense a voltage spike associated with a ground fault.

16. The ground fault interruption device of claim 15 wherein the transformer includes a toroidal current transformer.

17. The ground fault interruption device of claim 15 wherein the windings are sense windings that sense a positive or negative voltage spike indicative of a ground fault based on the difference between the current flow from the positive side of the load of the electrical loading component and the current from the negative side of the load of the electrical loading component.

18. The ground fault interruption device of claim 15 wherein the ground fault interruption component includes a DC Hall effect sensor or a fluxgate transducer.

* * * * *